UNITED STATES PATENT OFFICE.

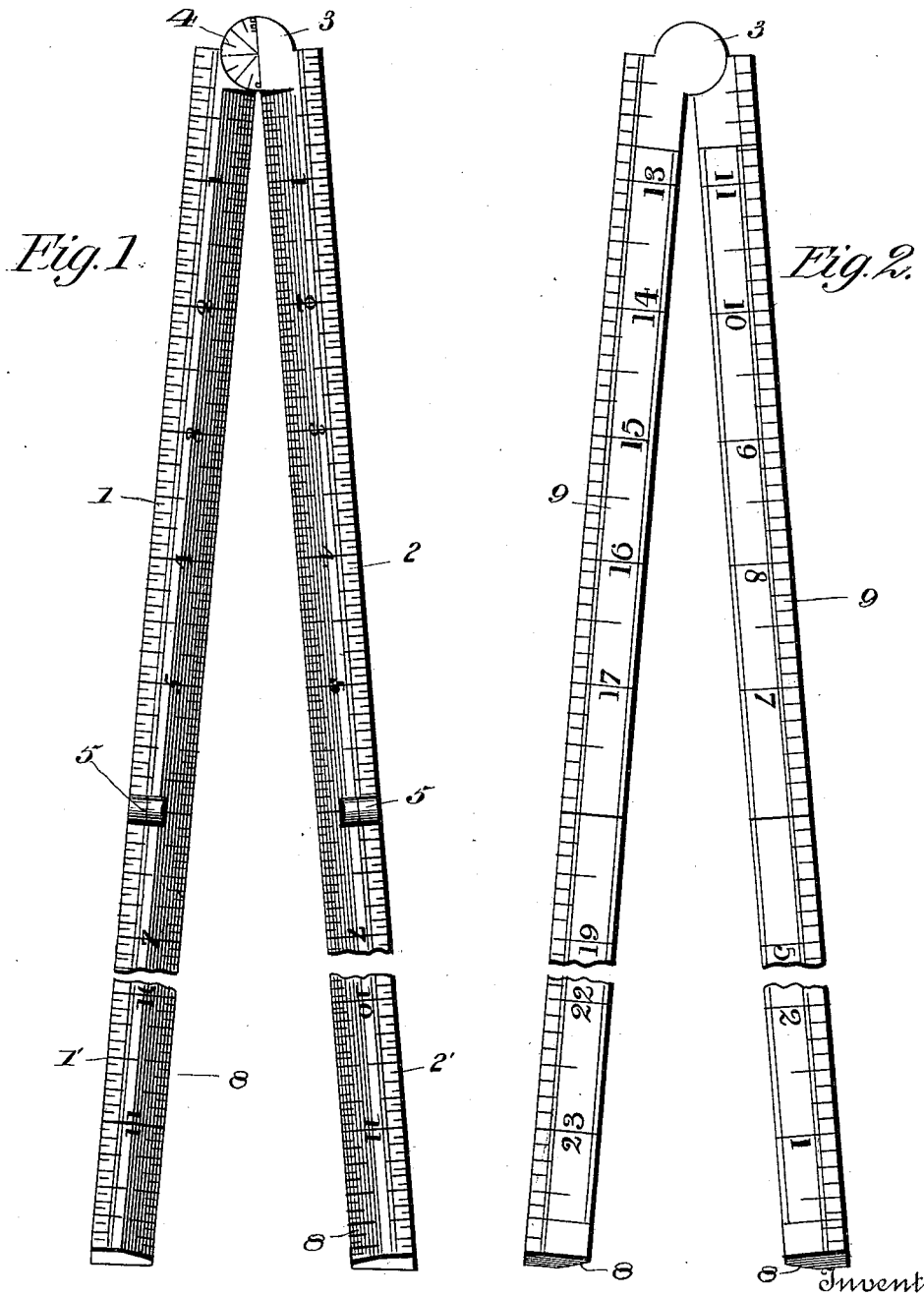

WILLIAM D. JONES, OF HOMESTEAD, PENNSYLVANIA.

RULE.

SPECIFICATION forming part of Letters Patent No. 650,793, dated May 29, 1900.

Application filed December 4, 1899. Serial No. 739,117. (No model.)

*To all whom it may concern:*

Be it known that I, WILLIAM D. JONES, a citizen of the United States of America, residing at Homestead, in the county of Allegheny and State of Pennsylvania, have invented certain new and useful Improvements in Rules, of which the following is a specification, reference being had therein to the accompanying drawings.
This invention relates to certain new and useful improvements in rules, and has for its primary object to construct a folding rule which may be employed for measuring objects in the ordinary manner and which will at the same time be particularly adapted for determining the radius of a circle.

Briefly described, the invention comprises two sections hinged together at their one end in a manner to close into parallel relation to or open into alinement with each other, each of these sections being formed of two pieces connected together by a hinge of less length than the width of the sections, whereby the latter may be beveled on their inner edges.
The sections are scaled on one face from zero at the outer end of the one section to the highest number determinable in inches, according to the length of the rule, at the other end, which scale permits the employment of the rule for ordinary measuring purposes, while on the beveled inner edge of the two sections the latter are scaled from the central line of the joint to the outer ends of the sections, the scale on each bevel-face being alike, so that the units of the scale on one beveled face will register with like units of the scale on the opposite section when the sections are brought together. I also provide the joint connecting the two sections together with a protracting scale for determining the degrees of the radius required, and the construction which I have herein shown as a simple and practical form of my invention will now be specifically described, and then pointed out in the claims, and in describing the invention in detail reference is had to the accompanying drawings, forming a part of this specification, and wherein like numerals of reference will be employed to designate like parts throughout the views, in which—

Figure 1 is a perspective view of my improved rule. Fig. 2 is an inverted perspective view thereof.

As stated, the rule comprises two sections, and each section consists of two parts 1 and 1' and 2 and 2', respectively. The parts 1 and 2 are joined together, as at 3, this joint preferably being constructed of a circular piece of metal connected to one of the sections and cut away to receive a tongue connected to the other section, this tongue being pivotally secured in the cut-away portion of the circular metal piece, though other convenient forms of pivotally securing the sections together at their one end may be employed. On the face of this joint 3 is arranged a protracting scale 4, as shown, indicating from naught to one hundred and eighty degrees of a circle, and a suitable series of indicating-marks to assist in obtaining the different degrees may be added, if so desired. The parts 1 and 2 of the sections have connected to their outer ends by means of the hinges 5 the foldable parts 1' and 2' of the sections. These hinges are of less length than the width of the sections to permit of the same being beveled on their inner edges, as at 8, and this beveled face of each section is scaled alike from the central line of the joint 3 to the outer ends of the sections, so that when the two sections are brought together like units upon the beveled faces of the sections will register. The inner edges of the sections are at all times upon a radial line with the center of the joint 3, from which point the scale is marked. It will be seen that by their having the inner edges upon the radial line of the joint the rule may readily be employed for determining the radius of a circle, the center of the joint 3 being the fulcrum-point and at all times remaining in the same relative position with respect to the sections of the rule while the latter are being moved away from or toward each other.

9 indicates a scale arranged on the outer face of the sections from zero at the outer end of one section to the highest number determinable in inches, according to the length of the rule, at the other end of the opposite section.

In order to determine a given radius of a segment or part of a circle, it is necessary that the one end of the segment or part of the circle should terminate at one of the units of the scale, so that the same will extend outwardly therefrom, and consequently the corresponding unit on the opposite scale will register with the edge of the segment when moved to the opposite unit. If during the movement of the section the unit will appear above or below the edge of the segment, the operator will know that the radius is incorrect, for the reason that, as above stated, the unit must register throughout with the edge of the segment.

Having fully described my invention, what I claim as new, and desire to secure by Letters Patent, is—

1. A rule formed of two hinged sections having one of their inner edges beveled, each of said sections being provided with a scale extending from the radial line of the hinge and throughout the beveled edges so that the units of the scale on one beveled edge will register with like units of the scale on the opposite beveled edge when the sections are brought together.

2. A rule comprising two hinged sections provided on one face with a scale calculated from end to end of the sections and on the other face with a scale which is calculated from the radial line of the hinge or joint to the outer ends of the sections.

In testimony whereof I affix my signature in the presence of two witnesses.

WILLIAM D. JONES.

Witnesses:
JOHN NOLAND,
WILLIAM E. MINOR.